United States Patent
Moyher, Jr. et al.

[11] Patent Number: 6,063,171
[45] Date of Patent: May 16, 2000

[54] BACTERICIDAL VACUUM CLEANER FILTER BAG

[75] Inventors: George C. Moyher, Jr., Bluff City, Tenn.; Joseph P. Urso, Dallas, Tex.

[73] Assignee: Electrolux LLC, Dallas, Tex.

[21] Appl. No.: 09/192,246

[22] Filed: Nov. 16, 1998

[51] Int. Cl.[7] .......................... B01D 39/08; B01D 29/27; B01D 50/00
[52] U.S. Cl. ................. 96/226; 55/372; 55/374; 55/DIG. 2
[58] Field of Search ............... 96/222, 223, 226, 96/227, FOR 175; 55/372, 374, 381, 524, DIG. 2

[56] References Cited

U.S. PATENT DOCUMENTS

| | | | |
|---|---|---|---|
| 1,828,584 | 10/1931 | Anderson | 96/226 |
| 4,113,851 | 9/1978 | Leveen et al. | 424/28 |
| 4,118,226 | 10/1978 | Bourassa | 55/279 |
| 4,302,225 | 11/1981 | Eckart et al. | 55/234 |
| 4,311,493 | 1/1982 | Schaefer et al. | 55/369 |
| 4,490,131 | 12/1984 | Coleman et al. | 493/217 |
| 4,554,698 | 11/1985 | Rennecker et al. | 15/339 |
| 4,610,651 | 9/1986 | Jacobson et al. | 493/212 |
| 4,610,702 | 9/1986 | Krantz | 55/155 |
| 4,613,348 | 9/1986 | Natale | 55/318 |
| 4,655,805 | 4/1987 | Krantz | 55/298 |
| 4,675,032 | 6/1987 | Genovese et al. | 55/96 |
| 4,695,299 | 9/1987 | Spadaro et al. | 55/274 |
| 4,704,100 | 11/1987 | Kaufman | 493/194 |
| 4,704,101 | 11/1987 | Schirmer | 493/195 |
| 4,749,386 | 6/1988 | Strohmeyer et al. | 55/131 |
| 4,833,753 | 5/1989 | Müller | 15/339 |
| 5,029,359 | 7/1991 | Ortega | 15/257 B |
| 5,040,264 | 8/1991 | Bryant | 15/339 |
| 5,074,997 | 12/1991 | Riley et al. | 210/97 |
| 5,104,427 | 4/1992 | Riley et al. | 55/18 |
| 5,153,965 | 10/1992 | Prosser et al. | 15/327.1 |
| 5,168,599 | 12/1992 | Williams | 15/346 |
| 5,240,484 | 8/1993 | Genovese et al. | 55/279 |
| 5,342,420 | 8/1994 | Bosses | 55/279 |
| 5,370,597 | 12/1994 | Genovese et al. | 493/186 |
| 5,461,751 | 10/1995 | Sepke | 15/246.3 |
| 5,480,030 | 1/1996 | Sweeney et al. | 206/524.8 |
| 5,626,744 | 5/1997 | Neuwirth | 210/97 |

FOREIGN PATENT DOCUMENTS

| | | | |
|---|---|---|---|
| 61-271013 | 12/1986 | Japan . | |
| 24073 | 10/1912 | United Kingdom | 96/FOR 175 |

*Primary Examiner*—David A. Simmons
*Assistant Examiner*—Robert A. Hopkins
*Attorney, Agent, or Firm*—Fish & Neave; Jeffrey H. Ingerman

[57] ABSTRACT

A vacuum cleaner filter bag exposes bacteria in incoming dirty air to bactericide throughout the useful life of the bag. Fingers provided on the interior walls of the bag are impregnated with bactericide. Air flow in the bag during vacuum cleaner operation causes the fingers to stand out from the wall, intercepting particles in the dirty airstream and exposing bacteria on those particles to the bactericide. The fingers stand out from the wall, and thus kill bacteria, substantially throughout the useful life of the bag, even after a cake of dust and dirt has formed on the inner walls of the bag.

23 Claims, 5 Drawing Sheets

BACTERICIDAL VACUUM CLEANER FILTER BAG

BACKGROUND OF THE INVENTION

This invention relates to vacuum cleaner filter bags. In particular, this invention relates to vacuum cleaner filter bags impregnated with bactericide. More particularly, this invention relates to a vacuum cleaner filter bag that more effectively brings bacteria and bactericide into contact with one another.

Dirt-laden air flowing into a vacuum cleaner typically is contaminated with bacteria. If the bacteria are small enough compared to the filtering ability of the filter bag of the vacuum cleaner, the bacteria may pass through the filtering medium of the filter bag and escape from the filter bag with the exhausted air. Alternatively, if the bacteria are too large to pass through the filter bag, they will remain in the filter bag where they will be free to multiply. In the latter case, eventually there may be enough bacteria to cause an unpleasant odor. In addition, some of the bacteria may escape, or they may be released when the filter bag is changed. Similarly, if for any reason a user must open a filter bag to examine its contents, the user could release the bacteria. This is the case with both disposable vacuum cleaner filter bags, which typically are made from one or more layers of filter paper, and reusable cloth vacuum cleaner filter bags.

It is known to treat the material of a vacuum cleaner filter bag with a bactericidal agent to kill bacteria. While this may be effective when the filter bag is new, and substantially all dirt entering the filter bag contacts the wall and the bactericidal agent, it is not true in a filter bag that has been used for any measurable length of time, because a "cake" of dust and dirt builds up on the interior walls of the filter bag, preventing bacteria from contacting the bactericidal agent. Therefore, treating the walls of a vacuum cleaner filter bag is effective substantially only to prevent bacterial colonies from "growing through" the filter bag.

It is also known in the case of a hand-held vacuum cleaner to provide a tube for introducing a bactericidal fluid. The tube extends into the dirt collection chamber and has a wick bag at the end thereof through which the bactericidal fluid is introduced into the airstream within the chamber. In one embodiment, the wick bag has a plurality of capillary tubes extending therefrom which move in the airstream to enhance the dispersion of the fluid.

It would be desirable to be able to provide a vacuum cleaner filter bag treated with a bactericidal agent that is able to kill bacteria even after a cake of dust and dirt has formed on the interior walls of the filter bag.

SUMMARY OF THE INVENTION

It is an object of this invention to provide a vacuum cleaner filter bag treated with a bactericidal agent that is able to kill bacteria even after a cake of dust and dirt has formed on the interior walls of the filter bag.

In accordance with the present invention, there is provided a vacuum cleaner filter bag having a wall including at least one layer of filter material. The wall encloses a space for the collection of dirt. The space has an opening for the entry of dirty air. At least one finger extends from the wall, and the finger is impregnated with bactericide. The finger is substantially flexible. When a flow of dirty air flows through the vacuum cleaner filter bag, the flow causes the finger to extend into the flow, exposing bacteria in said flow to the bactericide.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
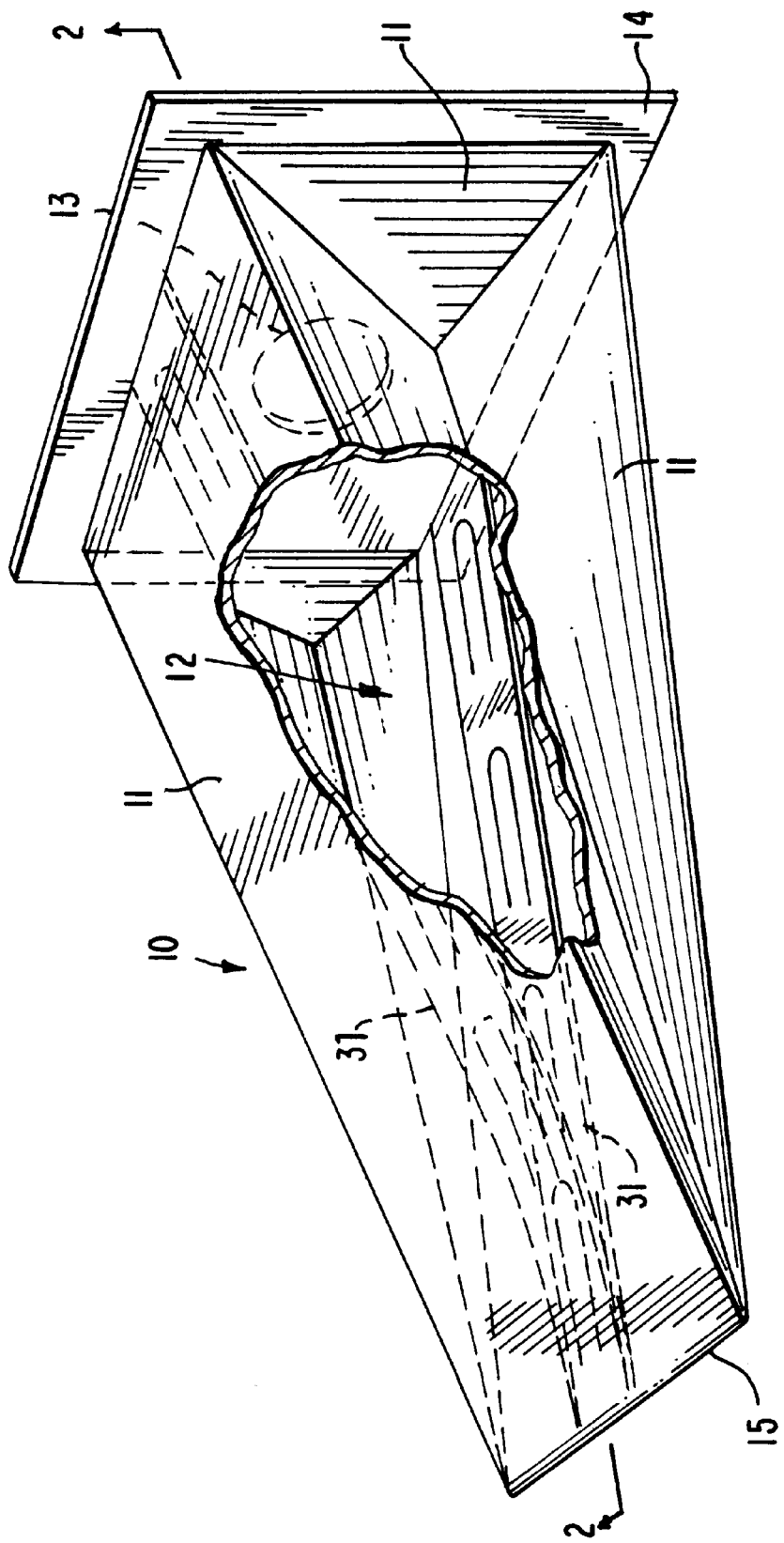
FIG. 1 is a partially fragmentary perspective view of a preferred embodiment of a vacuum cleaner filter bag in accordance with the present invention.
Figure 2:
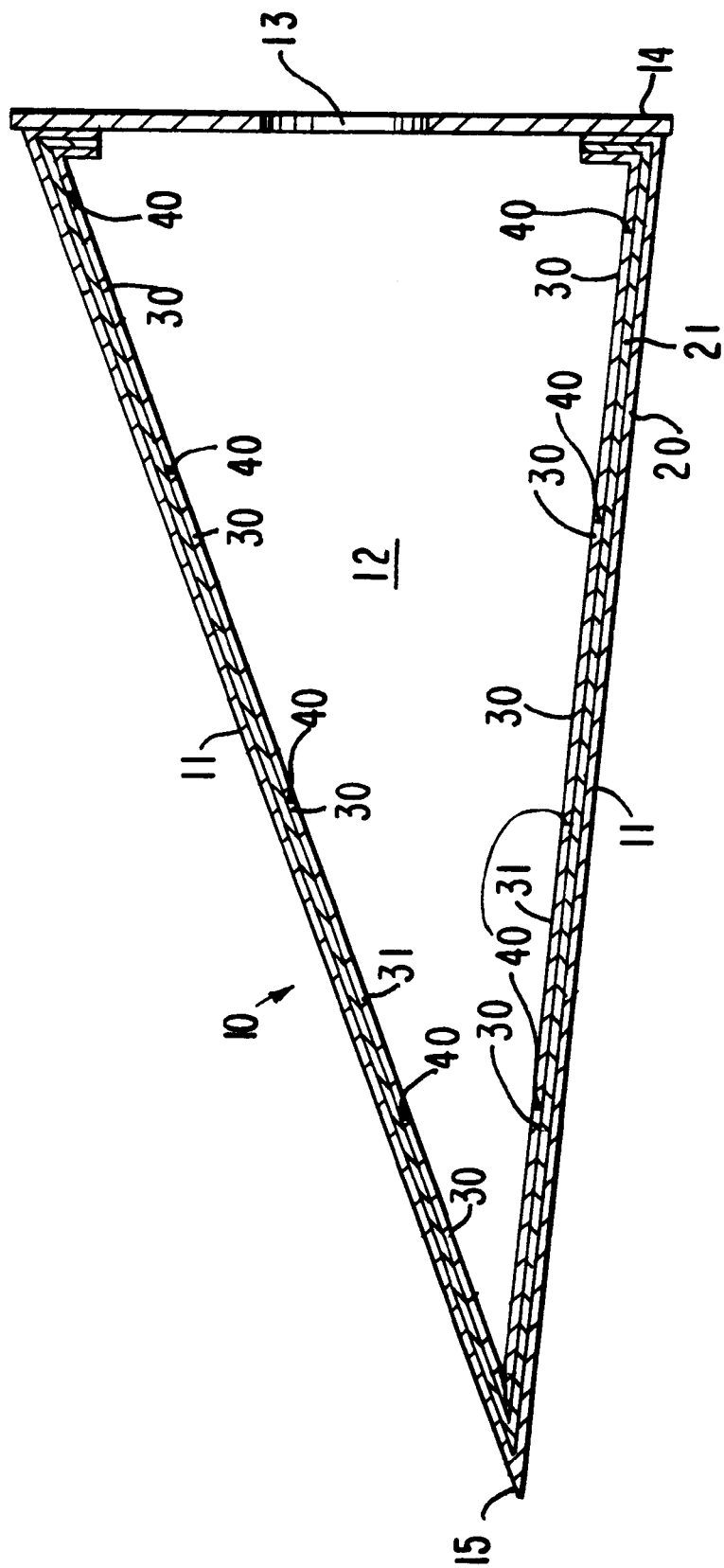
FIG. 2 is a cross-sectional view of the vacuum cleaner filter bag of FIG. 1, taken from line 2—2 of FIG. 1.
Figure 3:
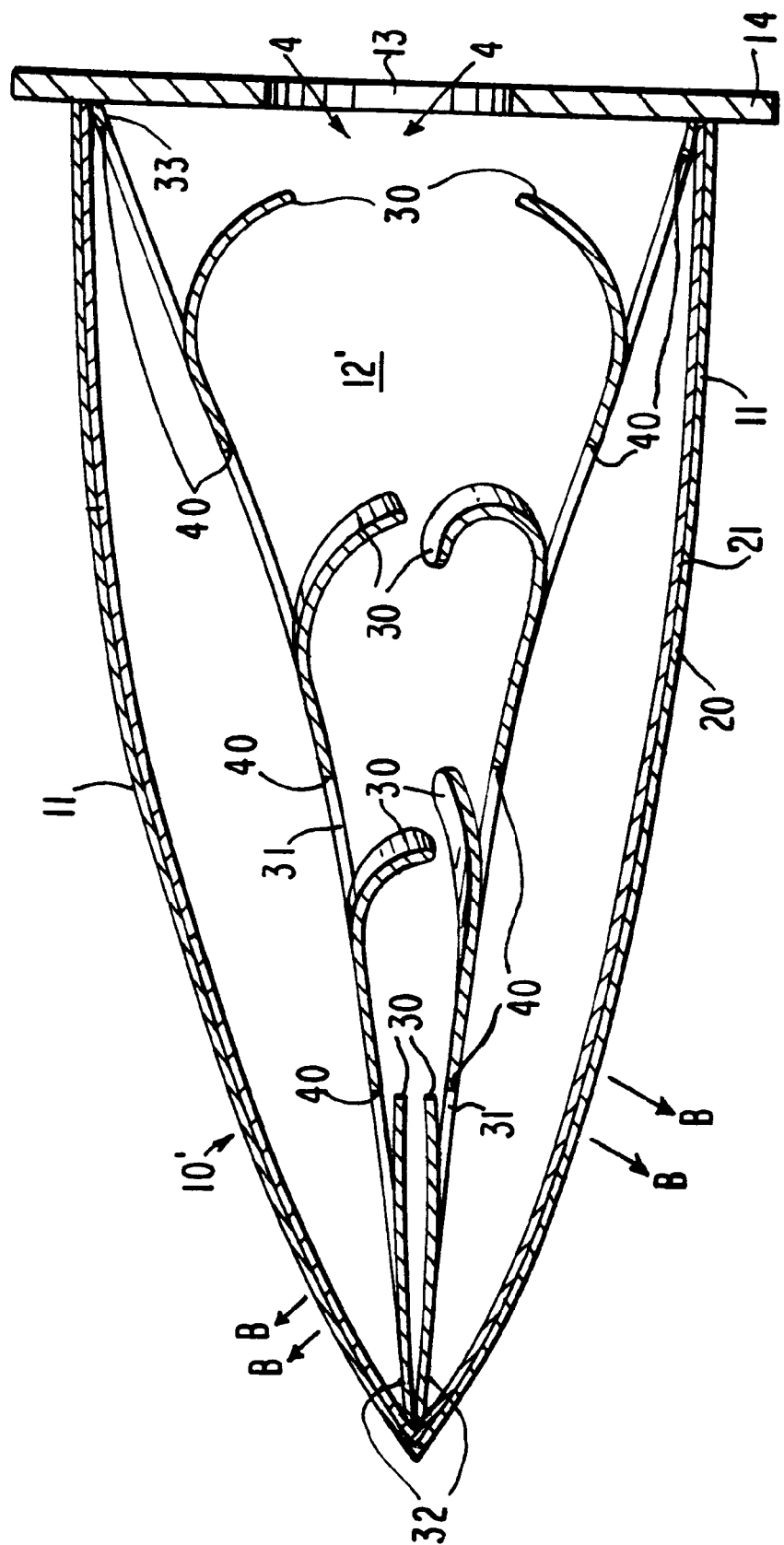
FIG. 3 is a cross-sectional view, similar to FIG. 2, of the vacuum cleaner filter bag of FIGS. 1 and 2 during vacuum cleaner operation.
Figure 4:
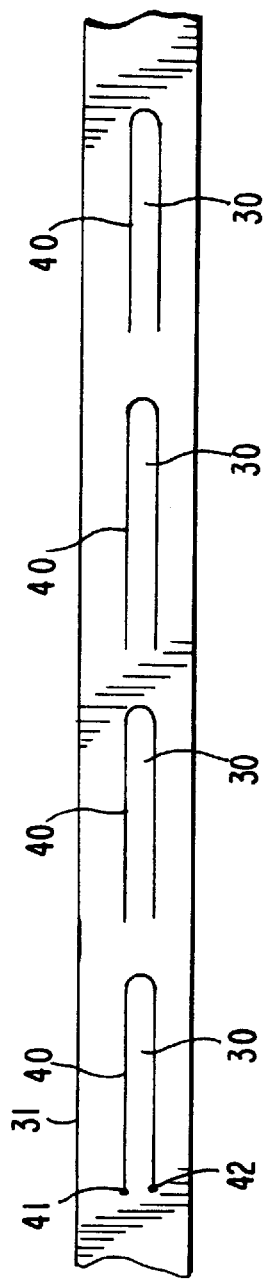
FIG. 4 is a plan view of a first preferred embodiment of a finger-bearing strip according to the present invention.
Figure 5:
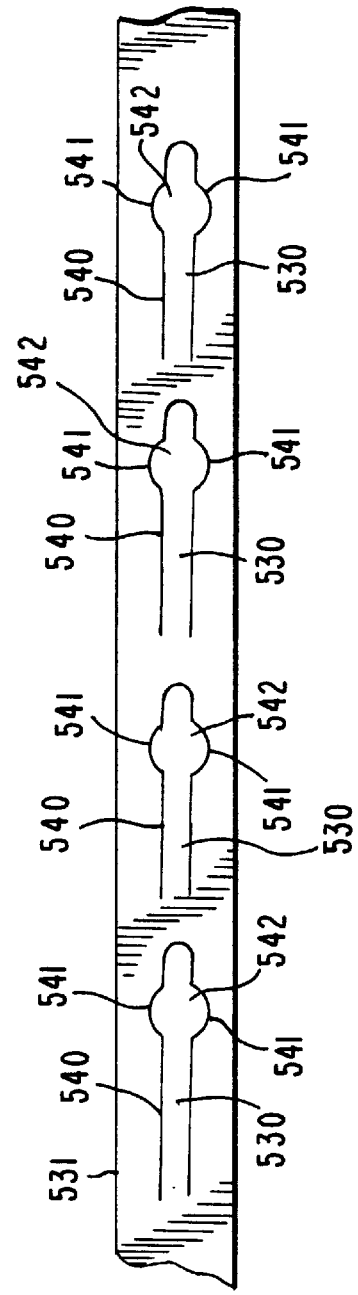
FIG. 5 is a plan view of a second preferred embodiment of a finger-bearing strip according to the present invention.
Figure 6:
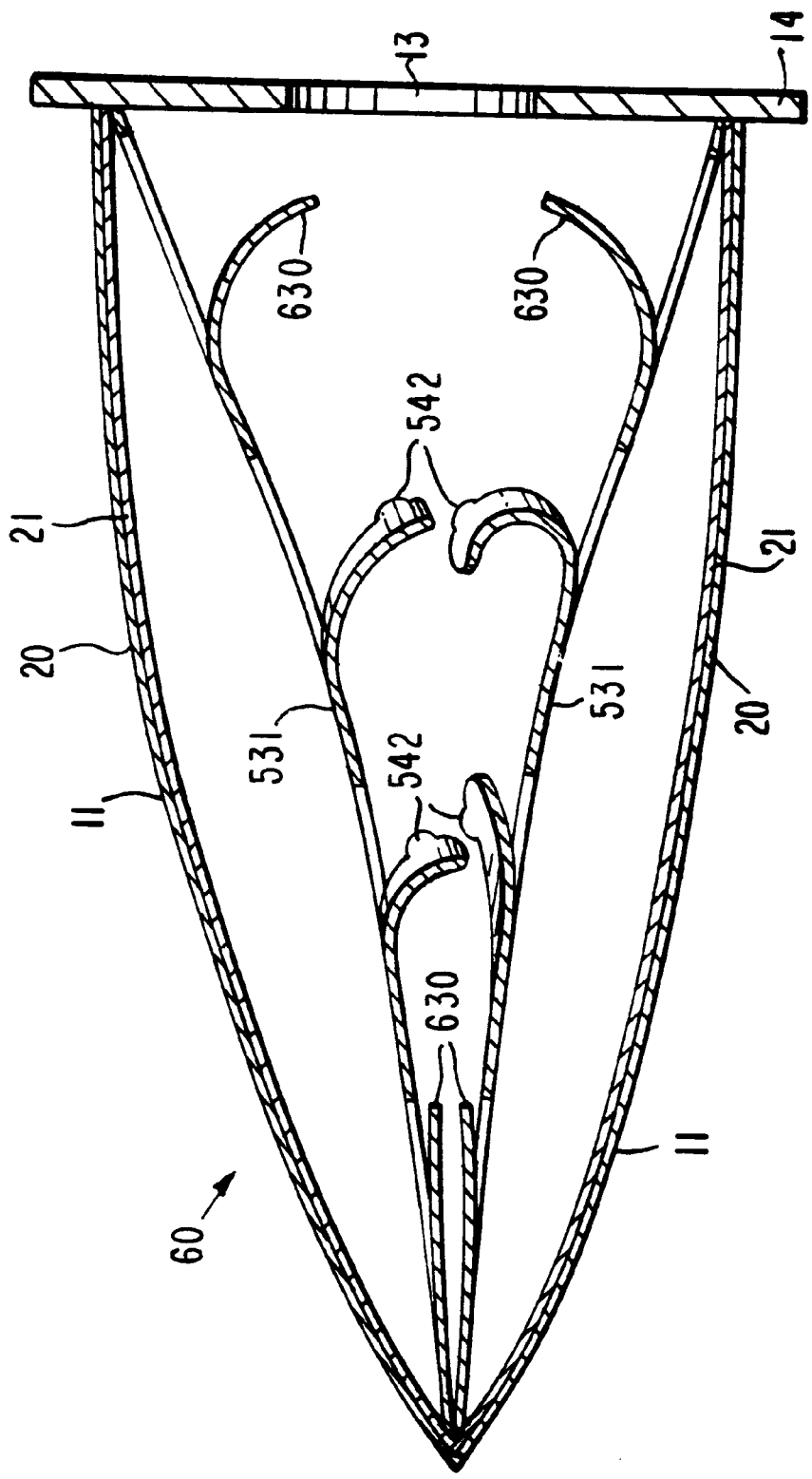
FIG. 6 is a cross-sectional view, similar to FIGS. 2 and 3, of a vacuum cleaner filter bag in accordance with the invention, in operation, having a strip as in FIG. 5.

The present invention achieves improved bactericidal action by delivering bactericide within the stream of dirt-laden air, rather than on the walls of the vacuum cleaner filter bag. This is accomplished by providing fingers of a flexible material attached to the interior wall of the vacuum cleaner filter bag, impregnated, in a manner which may be conventional, with bactericide. As the stream of dirt-laden air moves through the vacuum cleaner filter bag, it causes the fingers to stand out from the wall and extend into the airstream.

As dirt particles pass by the fingers, they come into contact, at random, with one or more of the fingers, exposing any bacteria on the particles to the bactericide. In addition, a particle may impact on, and be temporarily lodged in the material of, a finger, exposing any bacteria on such a particle to the bactericide for a much longer contact time, until the particle is dislodged by the action of the moving airstream. Because of the dislodging action, substantially no "cake" of dirt particles builds up on the fingers. Therefore, the bactericide remains available to contact incoming particles substantially throughout the useful life of the vacuum cleaner filter bag.

Both the dislodging action, which prevents build-up of a cake of particles, and the random contact of particles with the fingers, are enhanced by the fact that the air flow in the vacuum cleaner filter bag is non-laminar, as is generally the case in most or all vacuum cleaner filter bags. The non-laminar flow may be turbulent, or it may be less non-laminar than true turbulent flow, but still disturbed. The disturbed air flow (i.e., air flow that is turbulent or otherwise non-laminar) preferably causes the fingers to move about, preferably vigorously, within the airstream, increasing the exposure of particles in the airstream, and any bacteria they bear, to the bactericide.

The fingers may be made from any suitably flexible material, and may be affixed to the inner wall of the vacuum cleaner filter bag. For example, the fingers may be glued or stapled to the inner wall of the vacuum cleaner filter bag.

Alternatively, when the vacuum cleaner filter bag includes more than one layer (see below), the fingers can be formed directly in the inner wall of the vacuum cleaner filter bag by cutting an open-curve cut into the innermost layer of the wall, preferably by die-cutting, but other cutting methods may be used. By open-curve cut is meant any cut that starts at one point and ends at a different point (as distinguished from closed-curve cut which would start and end at the same point and result in the complete removal from the wall of the wall material inside the closed curve), without crossing itself. A particularly preferred open-curve cut has the shape of a thin elongated "U" (see below).

In another preferred embodiment, the fingers are formed in a strip which is affixed to the inner wall of the vacuum cleaner filter bag. In a particularly preferred version of this embodiment, the wall of the vacuum cleaner filter bag is formed of at least two layers, the innermost of which is a relatively fine filter material and the outermost of which is stronger than the innermost layer but is a relatively coarser filter. In this embodiment, a relatively narrow strip is formed of the same material as the outermost layer, and a series of fingers is formed by cutting long, narrow U-shaped cuts, preferably by die-cutting, preferably parallel to the length of the strip. The strip is adhered to the interior of the vacuum cleaner filter bag.

Although the strip can be adhered in any manner that does not result in the fingers themselves being adhered to the inner wall, preferably the strip is adhered to the bag only at its ends. For example, the ends of the strip may be fastened to the inner wall at the ends where the walls of the bag themselves are fastened together (see below).

More than one strip may be used. Preferably, two strips are used, and they are preferably placed on opposite sides of the vacuum cleaner filter bag.

In an alternative preferred embodiment, the fingers are formed from a shape having a "key" that tends to prevent any given finger from passing through the surface from which it extends. Thus, in the U-shaped fingers described above, an irregularity, or "bulge," may be formed in one or both legs of the "U," which tends to prevent the finger from passing back through the surface. This is particularly useful when the fingers are formed on strips that are only affixed at their ends to the vacuum cleaner filter bag. In the absence of such a bulge or other "key," if the strip moves away from the wall, one or more of the fingers may pass through the strip as a result of the disturbed flow. Any such fingers might not be able to pass back in the other direction, making them unavailable to enter the main airstream to kill bacteria. Provision of the "key" reduces the possibility of such "pass-through."

Any suitable bactericide may be used to impregnate the fingers of the present invention. However, a particularly preferred bactericide is the biocide MIRECIDE-M/86, based on a mixture of 5-chloro-2-methyl-4-isothiazolin-3-one and 2-methyl-4-isothiazolin-3-one, which is available from Laboratorios Miret, S.A. ("LAMIRSA"), of Les Fonts de Terrassa (Barcelona), Spain.

The invention will now be described with reference to FIGS. 1–6.

Vacuum cleaner filter bag 10 according to the present invention has a plurality of walls 11 enclosing a space 12 for the collection of dirt. Preferably, vacuum cleaner filter bag 10 is substantially in the shape of a triangular prism, as seen in FIG. 1. An opening 13 allows dirty air to enter space 12 under the application of vacuum when vacuum cleaner filter bag 10 is installed in an operating vacuum cleaner (not shown). Walls 11 are made of an air-permeable filter material, allowing relatively cleaner air to escape, leaving behind in space 12 particles of dirt too large to pass through walls 11. Preferably, the base of the pyramid containing opening 13 is made of a rigid material 14 for engagement with a mounting structure (not shown) in the vacuum cleaner. Although rigid material 14 is shown making up an entire side of vacuum cleaner filter bag 10, it may form only a portion of a wall surrounding opening 13.

Preferably, walls 11 are made from two layers 20, 21 of air-permeable material. Outer layer 20 preferably is relatively stronger than inner layer 21. However, while both outer and inner layers 20, 21 are air-permeable, inner layer 21 preferably is a finer filter than outer layer 20—i.e., outer layer 20 is a coarse filter that will allow particles to pass that inner layer 21, as a finer filter, will not allow to pass.

In such an embodiment, bactericide-impregnated fingers 30 could be cut directly from the material of inner layer 21, insofar as outer layer 20 remains intact. However, the opening of holes in inner layer 21 would allow unfiltered smaller particles, which could pass through outer layer 20 even though they could not pass through inner layer 21, to escape and reach outer layer 20, through which they then pass out of vacuum cleaner filter bag 10. One alternative is to make walls 11 from at least three layers, of which at least the middle layer is a fine filter, and cutting fingers 30 from the innermost layer. Another alternative is to form fingers 30 separately and then glue, sew, staple or otherwise fasten them individually to locations in the inner surfaces of walls 11.

However, in a particularly preferred embodiment, shown in the FIGURES, fingers 30 are provided in at least one strip 31 fastened to the interior of vacuum cleaner filter bag 10. In the preferred embodiment shown, two such strips 31 are provided on opposite sides of the interior of vacuum cleaner filter bag 10. Each strip 31 may be made from any suitably flexible material, but preferably is made from the same material as outer layer 20 of vacuum cleaner filter bag 10.

Another reason for providing fingers 30 on one or more strips 31 is that a particularly preferred way to impregnate fingers 30 with bactericide is to impregnate the material from which they are cut before they are cut. If fingers 30 are provided in a strip 31, then only strip 31 need be impregnated, while if fingers 30 are provided in a layer of wall 11, then the entire layer would have to be impregnated.

Whether fingers 30 are made individually, are cut directly into a layer of wall 11 of vacuum cleaner filter bag 10, or are provided on strip 31, they preferably are relatively long and narrow. If fingers 30 are too wide, they will impede the flow of air through vacuum cleaner filter, while if they are too narrow, they will not intercept enough particles to effectively kill a sufficient number of bacteria. Each finger 30 preferably is formed by making a single open-curve cut 40—i.e., a cut 40 extending from a point 41 to a point 42 different from point 41 without crossing itself. A particularly preferred shape for cut 40 is a narrow, elongated U-shape. Cut 40 is preferably formed by die-cutting.

During vacuum cleaner operation, as seen in FIG. 3, air enters vacuum cleaner filter bag 10 through opening 13 as indicated by arrows A and leaves through wall 11 as indicated by arrows B. The flow of air through vacuum cleaner filter bag 10 is disturbed, and causes fingers 30 to stand away from walls 11. As shown, fingers 30 not only stand out from the wall, but preferably move and twist in the disturbed air flow, thereby preferably intercepting the greatest possible number of particles, and preferably exposing any bacteria on those particles to the bactericide with which fingers 30 are impregnated.

Bacteria can be killed if the particle on which they are located impacts on a finger 30, where it can be temporarily lodged, exposing the bacteria to the bactericide in finger 30 before additional disturbed flow dislodges the particle from finger 30. Alternatively, even if a particle is not lodged in a finger 30, there may be times (as short as about a microsecond in duration) where, in places (as small as about a square micron), the air is relatively still within the disturbed flow, and a particle can come into contact with a finger 30, exposing bacteria on that particle to the bactericide.

If fingers 30 are provided on strips 31, strips 31 can be attached to the interior of vacuum cleaner filter bag 10 in any manner that allows fingers 30 to stand out from the wall. Thus, a strip 31 can be glued to the interior of wall 11 with adhesive placed everywhere where there is no finger 30, so that only fingers 30 themselves can stand out from the wall. Similarly, the edges of strip 31 can be stapled or sewn to wall 11 so that only fingers 30 can stand out from the wall. Alternatively and preferably, as shown in FIG. 3, strips 30 are attached to walls 11 only at the ends of strips 30, so that strips 30 themselves may stand away from walls 11 during vacuum cleaner operation. This has the advantage, where all of strip 31 is impregnated with bactericide, of introducing a greater bactericide-impregnated area into the airstream. More importantly, this has the advantage of easier assembly, because the ends of each strip 31 can be fastened to vacuum cleaner filter bag 10 during existing assembly operations. Specifically, for example, end 32 of each strip 31 can be trapped when end 15 of vacuum cleaner filter bag 10 is sealed, while end 33 of each strip 31 can be adhered to wall 11 in the same operation in which rigid material 14 is attached to wall 11.

If strip 31 is attached to vacuum cleaner filter bag 10 in such a way that it can stand away from walls 11 during vacuum cleaner operation, then there is a possibility that an individual finger 30, through the random effects of disturbed air flow, may pass through strip 31 into the space between strip 31 and wall 11, where it may not be as effective in intercepting bacteria-laden particles, and where it may become trapped on termination of vacuum cleaner operation, making it more difficult for that finger 30 to stand out from the wall during the next vacuum cleaner operation.

Therefore, in an alternate preferred embodiment of a strip 531 (shown in FIG. 5) according to this invention, each finger 530 is formed by an open-curve cut 540 having bulges 541 that form an enlarged area or "key" 542 in each finger 530. An alternate preferred embodiment of a vacuum cleaner filter bag 60 according to this invention, incorporating strips 531, is shown in FIG. 6 as it would appear during vacuum cleaner operation. The fingers designated 630 in FIG. 6 have their edges to the viewer, so that their keys 542 are not visible, but they are identical to fingers 530 of which keys 542 are clearly visible. Because key 542 is wider than the main portion of finger 530, and thus wider than the opening left in strip 531 by the cutting out of finger 530, finger 530 will not be able to pass back through that opening unless it either twists sufficiently to pass through sideways, or it folds back precisely to its original position and continues to move through the opening. Although it is possible for finger 530 to pass through strip 531 in one of those ways, it is less likely than if key 542 were not provided. For example, if the tip of a finger 30 were to attempt to pass through the opening in strip 31 near the base of that finger 30, it would be possible even without twisting of finger 30, because finger 30 and the opening have substantially the same width everywhere. However, if the tip of a finger 530 were to attempt to pass through the opening in strip 531 near the base of that finger 530, it would not be possible without significant twisting of finger 530 because key 542 would not be able to pass through that portion of the opening left by the narrow, non-key, portion of finger 530.

In either vacuum cleaner filter bag 10 or vacuum cleaner filter bag 60, during vacuum cleaner operation, fingers 30, 530 stand out from the wall in the air flow even after a cake of dust and dirt has formed on walls 11. Therefore, substantially throughout the useful life of vacuum cleaner filter bag 10, 60, bacteria on particles in the airstream are exposed to the bactericide in fingers 30, 530 and are killed, despite the presence of such a cake. Moreover, when the vacuum cleaner is not operating, the fingers lie in the accumulated dirt within the vacuum cleaner filter bag. Because those fingers are not coated by a cake, the bactericide in those fingers remains exposed, during the period when the vacuum cleaner is not operating, to bacteria in the accumulated dirt, and continues to kill those bacteria.

Although strips 31, 531 as shown are wide enough for only a single line of fingers 30, 530, wider strips could be provided, with more than one row of fingers on the strip. In such an embodiment, it might be advantageous in maximizing the bactericidal effect to stagger the fingers in adjacent rows on a single strip. The rows should be far enough apart that the fingers in one row do not become entangled with those in another row.

Similarly, where, as in the preferred embodiments shown, multiple strips are used on opposite sides of a vacuum cleaner filter bag, care should be taken that the fingers not be so long that fingers extending from one side become entangled in fingers extending from the other side. Thus, the fingers should be at most about as long as half the distance between the opposite sides of the vacuum cleaner filter bag.

Thus it is seen that a vacuum cleaner filter bag, treated with a bactericidal agent that is able to kill bacteria even after a cake of dust and dirt has formed on the interior walls of the filter bag, has been provided. One skilled in the art will appreciate that the present invention can be practiced by other than the described embodiments, which are presented for purposes of illustration and not of limitation, and the present invention is limited only by the claims that follow.

What is claimed is:

1. A vacuum cleaner filter bag comprising:

a wall comprising at least one layer of filter material, said wall enclosing a space for the collection of dirt, said space having an opening for the entry of dirty air; and at least one finger extending from said wall, said finger being impregnated with bactericide; wherein:

said finger is substantially flexible; and when a flow of said dirty air flows through said vacuum cleaner filter bag, said flow causes said finger to extend into said flow, exposing bacteria in said flow to said bactericide.

2. The vacuum cleaner filter bag of claim 1 comprising a plurality of said at least one finger.

3. The vacuum cleaner filter bag of claim 2 wherein said plurality of said at least one finger are located substantially along a line extending away from said opening.

4. The vacuum cleaner filter bag of claim 3 further comprising at least one strip adjacent said wall, said plurality of said at least one finger extending from each said strip.

5. The vacuum cleaner filter bag of claim 4 wherein said at least one strip comprises a plurality of strips.

6. The vacuum cleaner filter bag of claim 5 wherein said plurality of strips comprises two of said strips.

7. The vacuum cleaner filter bag of claim 4 wherein:

said wall comprises an outer layer of air-permeable material; and said strip comprises said air-permeable material.

8. The vacuum cleaner filter bag of claim 4 wherein each said at least one finger is formed by an open-curve cut in said strip.

9. The vacuum cleaner filter bag of claim 8 wherein said open-curve cut has an irregularity to minimize binding of said at least one finger in said cut.

10. The vacuum cleaner filter bag of claim 9 wherein said irregularity is key-shaped.

11. The vacuum cleaner filter bag of claim 8 wherein said finger is die-cut from said strip.

12. The vacuum cleaner filter bag of claim 4 wherein said strip is fastened to said wall.

13. The vacuum cleaner filter bag of claim 12 wherein said strip has first and second ends and is fastened to said wall substantially only at one or both of said first and second ends.

14. The vacuum cleaner filter bag of claim 2 wherein each said at least one finger is formed by an open-curve cut in said material.

15. The vacuum cleaner filter bag of claim 14 wherein said open-curve cut has an irregularity to minimize binding of said at least one finger in said cut.

16. The vacuum cleaner filter bag of claim 15 wherein said irregularity is key-shaped.

17. The vacuum cleaner filter bag of claim 14 wherein said finger is die-cut from said material.

18. The vacuum cleaner filter bag of claim 1 wherein each said at least one finger is formed by an open-curve cut in said material.

19. The vacuum cleaner filter bag of claim 18 wherein said open-curve cut has an irregularity to minimize binding of said at least one finger in said cut.

20. The vacuum cleaner filter bag of claim 19 wherein said irregularity is key-shaped.

21. The vacuum cleaner filter bag of claim 18 wherein said finger is die-cut from said material.

22. The vacuum cleaner filter bag of claim 1 wherein said bactericide comprises an isothiazoline.

23. The vacuum cleaner filter bag of claim 22 wherein said bactericide comprises a mixture of 5-chloro-2-methyl-4-isothiazolin-3-one and 2-methyl-4-isothiazolin-3-one.

* * * * *